United States Patent [19]
Lai

[11] Patent Number: 6,067,750
[45] Date of Patent: May 30, 2000

[54] AUTOMATIC SPRINKLING DEVICE FOR A BEAN SPROUT CULTURE BOX ASSEMBLY

[76] Inventor: Wen-Chi Lai, No. 1, Lane 197, Tzu Chiang S. St., Feng Yuan City, Taichung Hsien, Taiwan

[21] Appl. No.: 09/073,850

[22] Filed: May 7, 1998

[30] Foreign Application Priority Data

Jul. 28, 1997 [TW] Taiwan ................................. 86212728

[51] Int. Cl.[7] .............................. A01G 31/06; A01C 1/02
[52] U.S. Cl. ........................................ 47/62; 47/14; 47/61
[58] Field of Search ................................ 47/60, 61, 62 R, 47/62 E, 59, 79, 82, 83, 14; 239/20, 19, 17, 16

[56] References Cited

U.S. PATENT DOCUMENTS

| | | | |
|---|---|---|---|
| 2,012,180 | 8/1935 | Beck | 47/61 |
| 3,328,912 | 7/1967 | Poon | 47/61 |
| 3,616,560 | 11/1971 | Mun | 47/61 |
| 3,768,201 | 10/1973 | Yoo | 47/16 |
| 3,965,614 | 6/1976 | Kienholz | 47/14 |
| 3,992,809 | 11/1976 | Chew | 47/62 |
| 4,057,930 | 11/1977 | Barham | 47/61 |
| 4,144,671 | 3/1979 | Lee | 47/14 |
| 4,180,941 | 1/1980 | Korematsu | 47/14 |
| 4,926,598 | 5/1990 | Chung | 47/61 |
| 4,934,096 | 6/1990 | Bentvelsen | 47/62 |
| 5,025,589 | 6/1991 | Park | 47/61 |
| 5,042,195 | 8/1991 | Lee | 47/61 |
| 5,184,420 | 2/1993 | Papadopoulos et al. | 47/62 |
| 5,558,984 | 9/1996 | Young et al. | 435/3 |
| 5,636,474 | 6/1997 | Lo | 47/61 |

FOREIGN PATENT DOCUMENTS

| | | | |
|---|---|---|---|
| 2164535A | 3/1986 | United Kingdom | 47/61 |
| 8500269 | 1/1985 | WIPO | 47/61 |

*Primary Examiner*—Michael J. Carone
*Assistant Examiner*—Son T. Nguyen
*Attorney, Agent, or Firm*—Bacon & Thomas, PLLC

[57] ABSTRACT

An automatic sprinkling device for a bean sprout culture box assembly including a base box and a stacked culture boxes. The device includes a pump mounted on the base box which pumps water from the base box to the top culture box. The device includes a pump actuating circuit that actuates the pump, a transistor having a base and a collector, and a relay having a first end connected to the collector of the transistor and a second end connected to the pump. A microprocessor having an output is connected to the base of the transistor. A data setting unit is connected to an input of the microprocessor and arranged to input data into the microprocessor. A display unit is connected to the output of the microprocessor and displays data generated by the data setting unit. A memory device is connected to the microprocessor and is arranged to store data set by the data setting unit.

3 Claims, 6 Drawing Sheets

AUTOMATIC SPRINKLING DEVICE FOR A BEAN SPROUT CULTURE BOX ASSEMBLY

1. FIELD OF THE INVENTION

The present invention relates to an automatic sprinkling device, and more particularly to an automatic sprinkling device for a bean sprout culture box assembly.

2. BACKGROUND OF THE INVENTION

A conventional sprinkling device for a bean sprout culture box assembly is shown in FIG. 6, and there will be a complete illustration in the detailed description of the preferred embodiments, concerning the conventional sprinkling device.

The present invention has arisen to mitigate and/or obviate the disadvantage of the conventional sprinkling device.

SUMMARY OF THE INVENTION

In accordance with one aspect of the present invention, there is provided an automatic sprinkling device for a bean sprout culture box assembly which comprises a base box and a stacked plurality of culture boxes.

The automatic sprinkling device comprises a pump mounted on the base box for pumping water from the base box to a topmost one of the stacked plurality of culture boxes and including a power supply, a pump actuating circuit mounted on the base box for actuating the pump and comprising a transistor including a base and a collector, and a relay including a first end connected with the collector of the transistor and a second end connected with the power supply of the pump, a microprocessor mounted on the base box and including an input and an output connected with the base of the transistor, a data setting unit mounted on the base box and connected with the input of the microprocessor for inputting data into the microprocessor, a display unit mounted on the base box and connected with the output of the microprocessor for displaying data set by the data setting unit, and a memory mounted on the base box and connected with the microprocessor for storing data set by the data setting unit.

Further features of the present invention will become apparent after a careful reading of the detailed description with appropriate reference to the accompanying drawings.

DETAILED DESCRIPTION OF THE PREFERRED EMBODIMENTS

Figure 6:
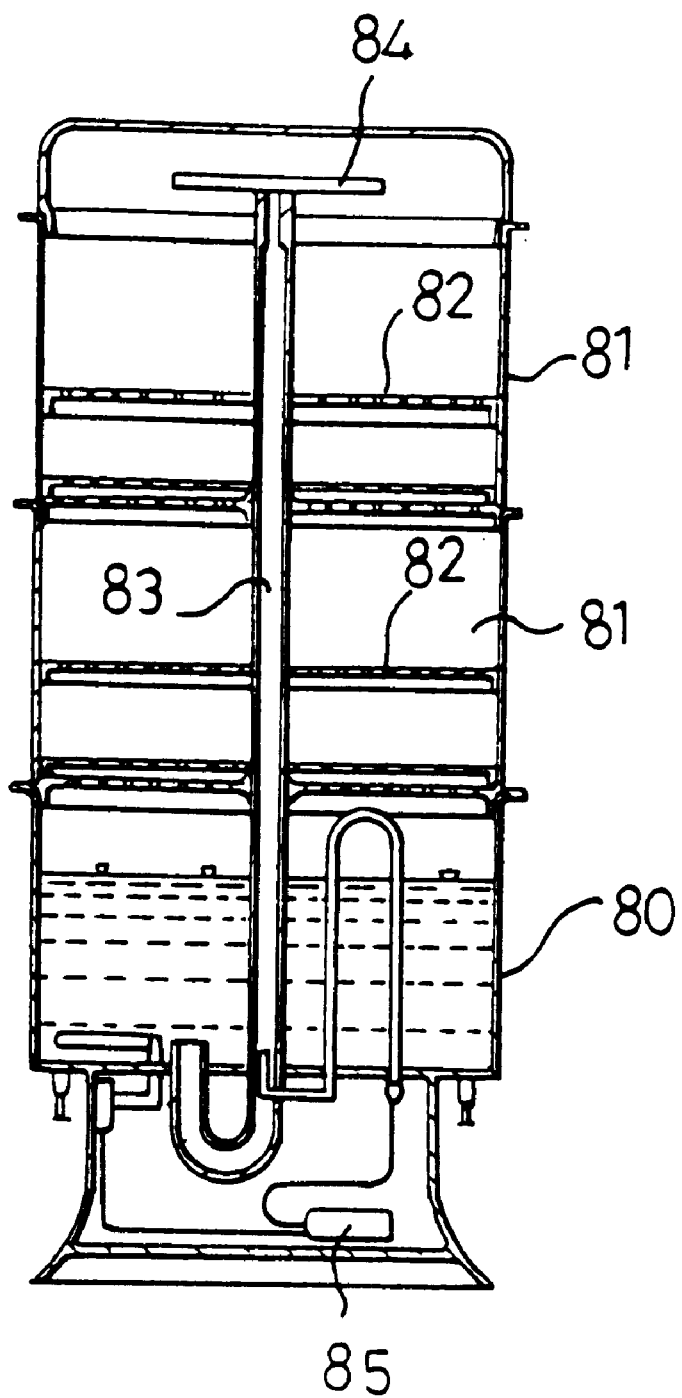
FIG. 6 is front plan cross-sectional assembly view a conventional sprinkling device for a bean sprout culture box in accordance with the prior art.

For a better understanding of the present invention, reference is made to FIG. 6 illustrating a conventional sprinkling device in accordance with the prior art. The convention sprinkling device can be adapted for a bean sprout culture box assembly which comprises a water tank 80, a stacked plurality of culture boxes 81 each stacked on the water tank 80, and a plurality of filtering nets 82 each supported in a corresponding one of the culture boxes 81. The sprinkling device comprises a pump 85 for pumping water from the water tank 80 into a topmost one of the stacked plurality of culture boxes 81 via a pipe 83, and a sprinkler 84 mounted on the topmost culture box 82 for sprinkling water into the culture boxes 81.

By such an arrangement, however, the pump 85 is operated manually, thereby easily causing an inconvenience during executing the sprinkling process of the sprinkling device.

Figure 1:
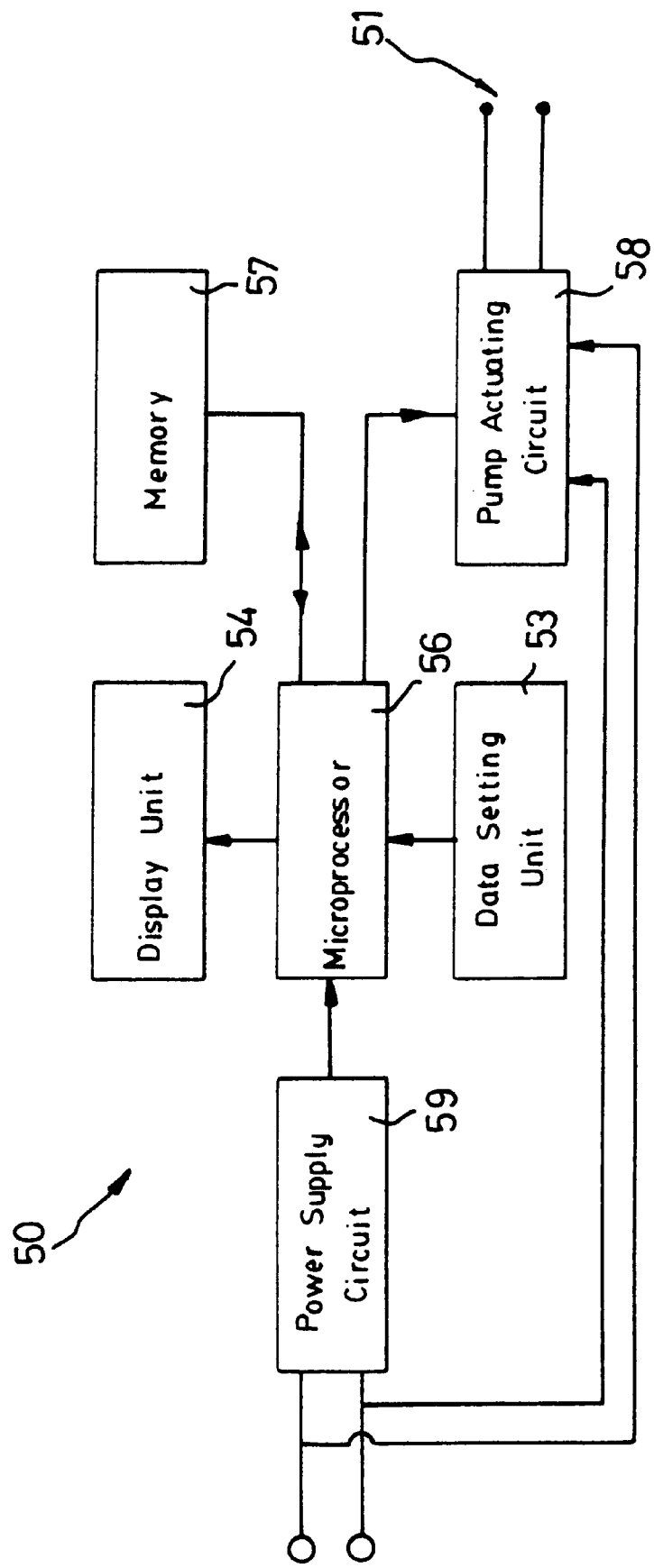
FIG. 1 is a block diagram of an automatic sprinkling device in accordance with the present invention.
Figure 2:
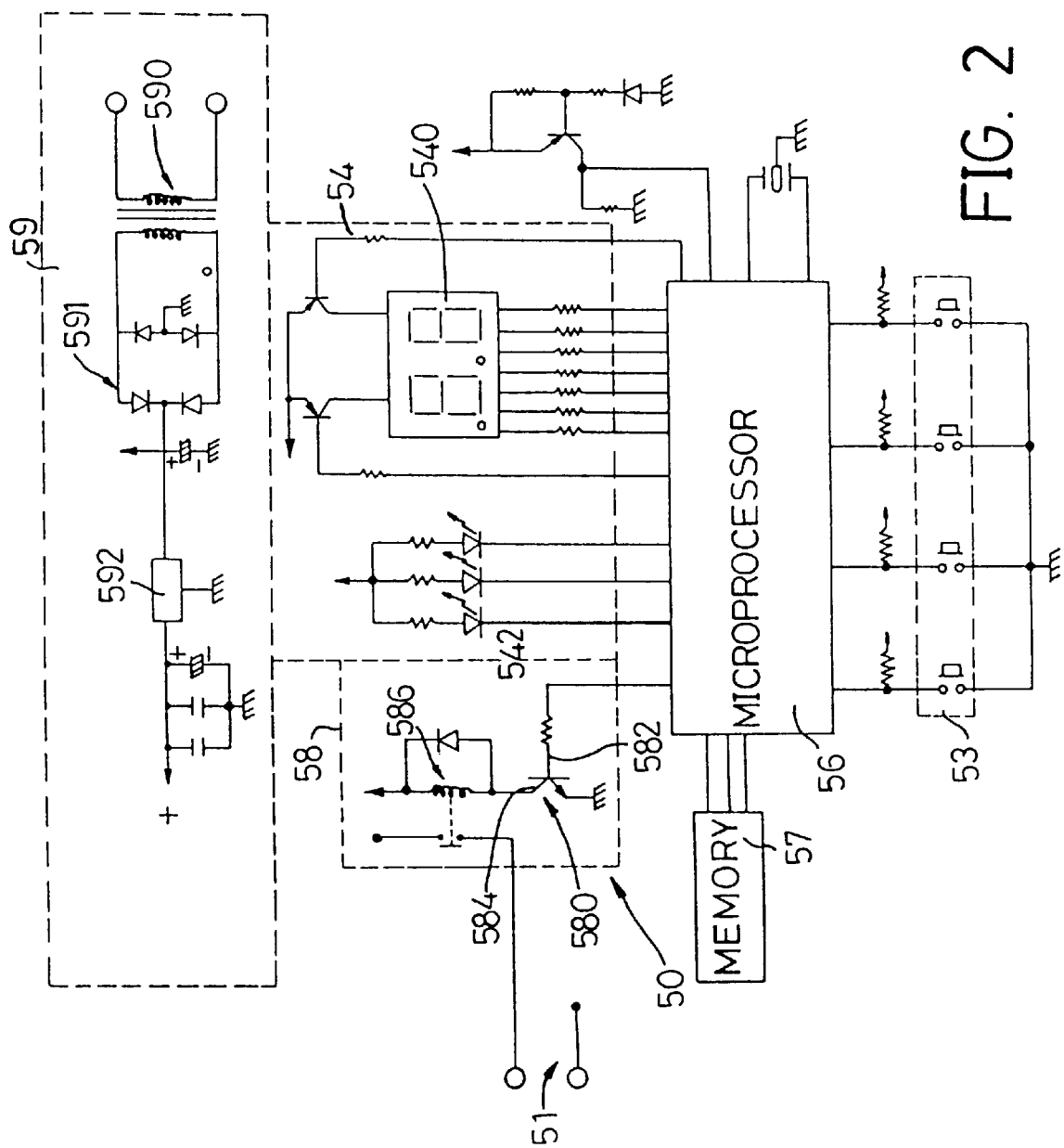
FIG. 2 is a detailed circuit diagram of the automatic sprinkling device as shown in FIG. 1.
Figure 3:
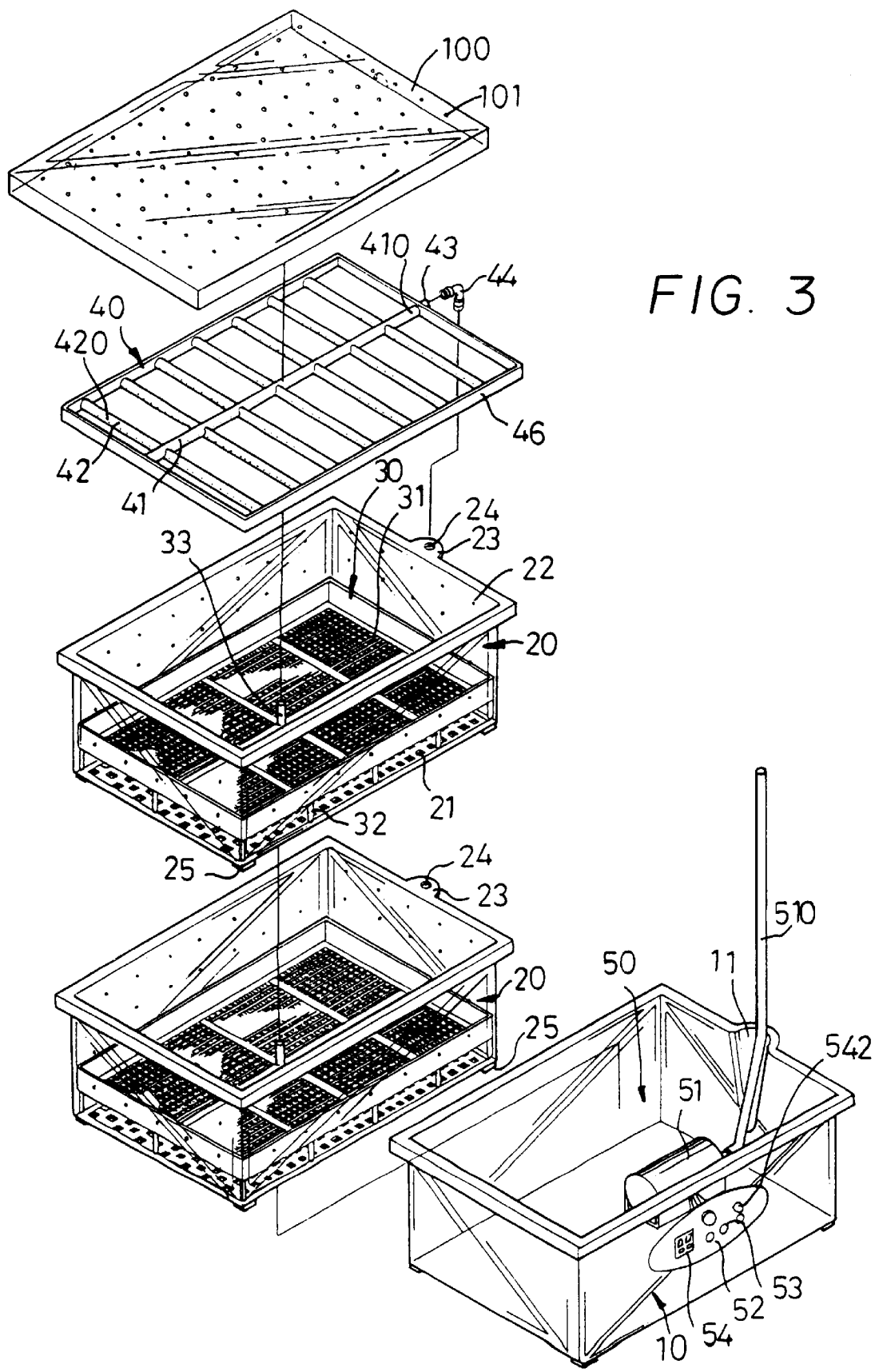
FIG. 3 is an exploded view of a bean sprout culture box assembly in accordance with the present invention.

Referring to the remaining drawings and initially to FIGS. 1–3, an automatic sprinkling device 50 in accordance with the present invention can be adapted for a bean sprout culture box assembly which comprises a base box 10, a stacked plurality of culture boxes 20, a plurality of net brackets 30 each received in a corresponding one of the stacked plurality of culture boxes 20, a sprinkling member 40 mounted in a topmost one of the stacked plurality of culture boxes 20, and a top cover 100 mounted on the topmost one of the stacked plurality of culture boxes 20.

The automatic sprinkling device 50 comprises a pump 51 mounted on a bottom wall of the base box 10 for pumping water from the base box 10 to the topmost one of the stacked plurality of culture boxes 20 and including a power supply. A pipe 510 includes a first end connected to the pump 51 and a second end connected to the sprinkling member 40 for supplying water from the base box 10 to the topmost one of the stacked plurality of culture boxes 20.

A control board 52 is mounted on a side wall of the base box 10. A pump actuating circuit 58 is mounted on the control board (not shown in FIG. 3) for actuating the pump 51 and comprises a transistor 580 including a base 582 and a collector 584, and a relay 586 including a first end connected with the collector 584 of the transistor 580 and a second end connected with the power supply of the pump 51.

A microprocessor 56 is mounted on the control board 52 and includes an input and an output connected with the base 582 of the transistor 580. A data setting unit 53 is mounted on the control board 52 and is connected with the input of the microprocessor 56 for inputting data into the microprocessor 56. A display unit 54 is mounted on the control board 52 and is connected with the output of the microprocessor 56 for displaying data set by the data setting unit 53.

A memory 57 is mounted on the control board 52 and is connected with the microprocessor 56 for storing data set by the data setting unit 53. The memory 57 is preferably composed of an electrically erasable programmable read-only memory (E.E.P.R.O.M.).

Figure 4:
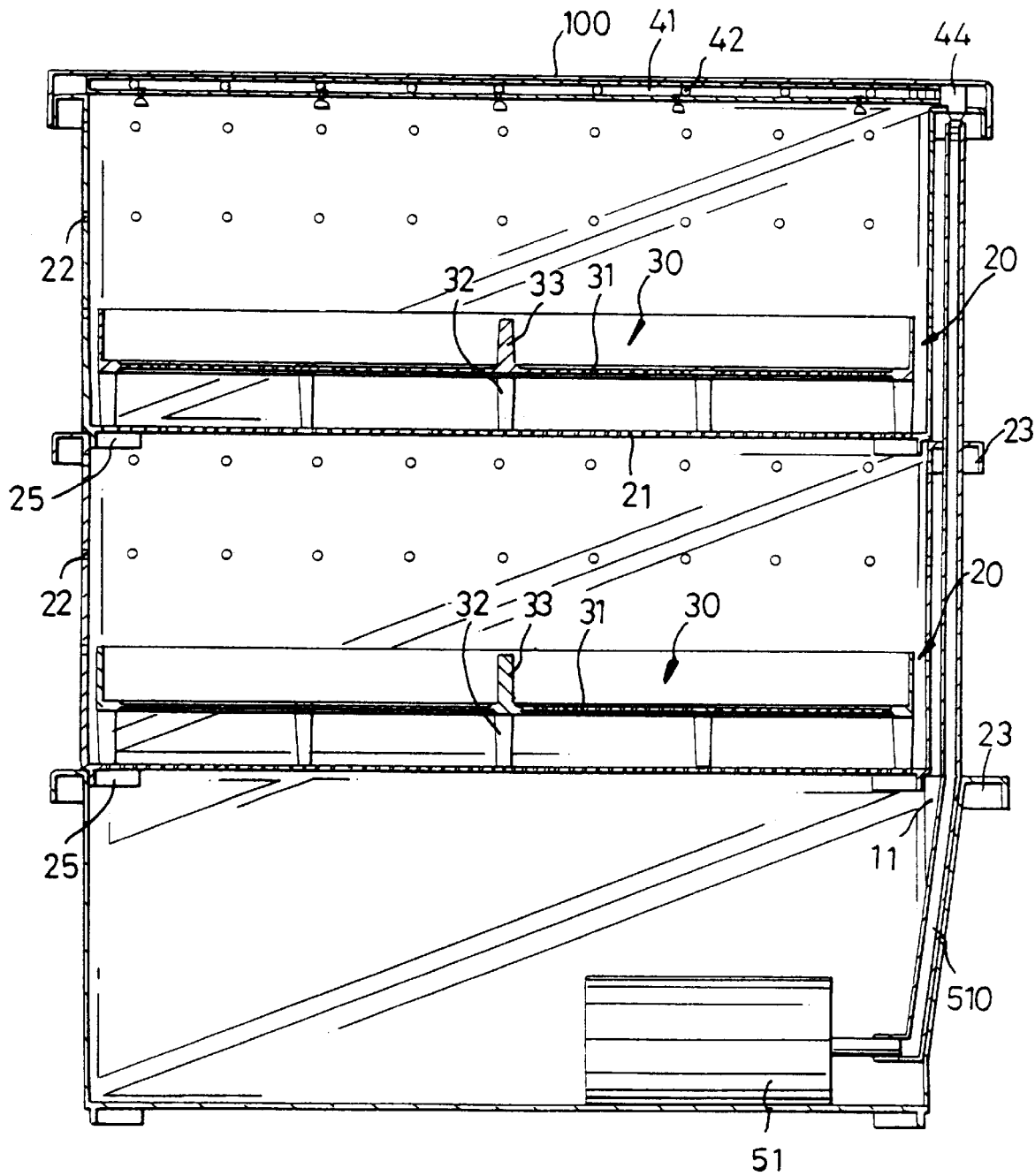
FIG. 4 is a front plan cross-sectional assembly view of the bean sprout culture assembly as shown in FIG. 3.

Referring now to FIGS. 3 and 4, the base box 10 is made of transparent material and includes a side wall defining a chute 11 for receiving the pipe 510 therein.

Each of the culture boxes 20 is made of transparent material and includes a bottom wall formed with a plurality of openings 21 and four side walls each defining a plurality of vents 22, and an ear 23 protruding from one side wall and including a bore 24 for receiving the pipe 510 therein. Each of the culture boxes 20 includes four corners each formed with a positioning pad 25.

Each of the net brackets 30 includes a metallic net sheet 31 having a top portion formed with a handgrip 33 at a center thereof extending upwardly, and a bottom portion formed with a plurality of supporting legs 32 each extending downwardly to abut on the bottom portion of the culture box 20.

The sprinkling member 40 comprises a rectangular frame 46 supported on the topmost one of the stacked plurality of culture boxes 20, a first tube 41 mounted in the rectangular frame 46 and defining a plurality of first draining bores 410, and a plurality of second tubes 42 each mounted in the rectangular frame 46 and each defining a plurality of second draining bores 420. Preferably, each of the second tubes 42 intersects and communicates with the first tube 41. The first tube 41 includes one distal end formed with a water inlet 43 connected to the second end portion of the pipe 510 by a coupling 44.

The top cover 100 is made of transparent material and defines a plurality of vents 101 therein.

In practice, referring to FIGS. 1 and 2, the data setting unit 53 comprises a plurality of buttons (not shown) each of which can be adapted to set the following data respectively:

(1) ON/OFF button: representing a power supply switch;
(2) HOUR button: sprinkling period setting which represents the time interval between two sprinkling operations, wherein the unit of the setting value is a multiple of an hour, for example, if the setting value is five, it means that the sprinkling operation is executed once every five hours;
(3) SEC button: sprinkling time setting which represents the period of time of every sprinkling operation, wherein the unit of the setting value is a multiple of a second, for example, if the setting value is ten, it means that the sprinkling operation is executed for ten seconds every five hours; and
(4) manual button: representing that the sprinkling operation is executed manually by a user.

The display unit 54 includes a plurality of indicators 540 for displaying the sprinkling period setting values and a plurality of indicating lamps 542 for displaying the sprinkling time setting values.

A power supply circuit 59 is provide for supplying power to the automatic sprinkling device 50 and comprises a transformer 590, a bridge rectifier 591 and a steady state integrated circuit (I.C.).

Figure 5:
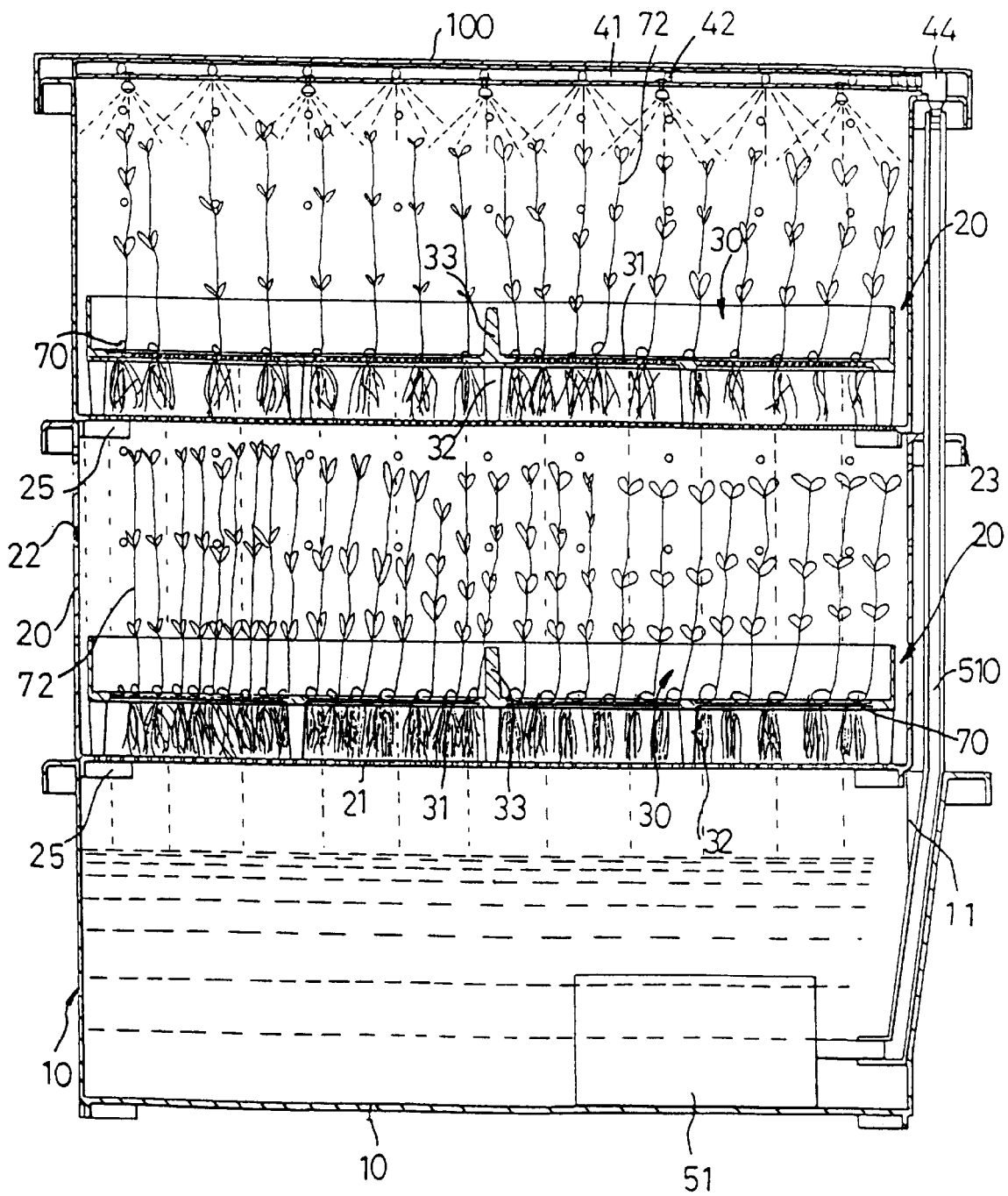
FIG. 5 is an operational view of FIG. 4.

In operation, referring to FIGS. 3–5 with reference to FIGS. 1 and 2, the data setting unit 53 can be adapted to set the sprinkling period and the sprinkling time for sprinkling water into the bean sprout culture box assembly. When the sprinkling time period set by the data setting unit 53 is reached, the microprocessor 56 will send a signal into the pump actuating unit 58 which in turn drives the transistor 580 to activate the relay 586, thereby electrically connecting the second end of the relay 586 with the power supply of the pump 51 such that the pump 51 can be actuated to pump water from the base box 10 into the first and second tubes 41 and 42 of the sprinkling member 40 via the pipe 510.

Water can then be sprinkled into the topmost one of the culture boxes 20 via the first and second draining bores 410 and 420, and then in turn flow into other culture boxes 20, and finally flow into the base box 10.

The pump 51 will stop operating when the microprocessor 56 signals to the pump actuating unit 58 that the predetermined period of sprinkling time set by the data setting unit 53 is reached, thereby stopping supply of water into the bean sprout culture box assembly.

The above-mentioned procedures can be repeated successively. In such a manner, bean seeds 70 supported on the net sheet 31 of each of the net frames 30 can be gradually grown into bean sprouts 72 as shown in FIG. 5 by means of an intermittent water sprinkling process.

It should be clear to those skilled in the art that further embodiments may be made without departing from the scope and spirit of the present invention.

What is claimed is:

1. An automatic sprinkling device (50) in combination with a bean sprout culture box assembly comprising:

a base box (10);

a plurality of culture boxes (20) stacked on top of one another;

a plurality of brackets (30) each positioned in a corresponding one of said plurality of culture boxes (20);

a sprinkling member (40) mounted in the topmost one of said plurality of culture boxes (20) and having a rectangular frame (46) supported on the topmost one of said plurality of culture boxes (20);

a first tube (41) mounted in said rectangular frame (46) and including a plurality of first bores(410);

a plurality of second tubes (42) each mounted in said rectangular frame (46) and each including a plurality of second bores (420);

a pump (51) mounted on said base box (10) configured to pump water from said base box (10) to the topmost one of said plurality of culture boxes (20) and including a power supply;

a pipe (510) having a first end connected to said pump (51) and a second end connected to said sprinkling member (40) and configured to supply water from said base box (10) to the topmost one of said plurality of culture boxes (20);

a pump actuating circuit (58) mounted on said base box (10) configured to actuate said pump (51) and including a transistor (580) having a base (582) and a collector (584) and a relay (586) having a first end connected to said collector (584) of said transistor (580) and a second end connected with said power supply of said pump (51);

a microprocessor (56) mounted on said base box (10) and including an input and an output connected to said base (582) of said transistor (580);

a data setting unit (53) mounted on said base box (10) and connected to said input of said microprocessor (56) and arranged to input data into said microprocessor (56);

a display unit (54) mounted on said base box (10) and connected to the output of said microprocessor (56) for displaying data set by said data setting unit (53); and a memory (57) mounted on said base box (10) and connected to said microprocessor (56) for storing data generated by said data setting unit.

2. The automatic sprinkling device in combination with the bean sprout culture box assembly as recited in claim 1, wherein one or more of said second tubes (42) intersects and communicates with said first tube (41).

3. The automatic sprinkling device in combination with the bean sprout culture box assembly as recited in claim 1, wherein said first tube (41) includes one distal end formed with a water inlet (43) coupled to the second end portion of said pipe (510).

* * * * *